(12) United States Patent
Kim et al.

(10) Patent No.: US 9,029,017 B2
(45) Date of Patent: May 12, 2015

(54) LITHIUM COMPOSITE OXIDE FOR A LITHIUM SECONDARY BATTERY AND POSITIVE ELECTRODE FOR A LITHIUM SECONDARY BATTERY INCLUDING THE LITHIUM COMPOSITE OXIDE

(75) Inventors: Yong-Seon Kim, Yongin-si (KR); Do-Yu Kim, Yongin-si (KR); Yong-Chul Park, Yongin-si (KR); Gyeong-Jae Heo, Yongin-si (KR); Mi-Ran Song, Yongin-si (KR); Hyun-Deok Lee, Yongin-si (KR); Jin-Hyoung Seo, Yongin-si (KR); Min-Ju Kim, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 0 days.

(21) Appl. No.: 13/560,146

(22) Filed: Jul. 27, 2012

(65) Prior Publication Data

US 2013/0108926 A1  May 2, 2013

(30) Foreign Application Priority Data

Oct. 28, 2011  (KR) .................. 10-2011-0111409

(51) Int. Cl.
*H01M 4/02* (2006.01)
*H01M 4/40* (2006.01)
*H01M 4/525* (2010.01)
*H01M 4/131* (2010.01)
*H01M 4/505* (2010.01)
*H01M 10/052* (2010.01)
*C01G 53/00* (2006.01)

(52) U.S. Cl.
CPC .............. *H01M 4/525* (2013.01); *Y02E 60/122* (2013.01); *H01M 4/131* (2013.01); *H01M 4/505* (2013.01); *H01M 10/052* (2013.01); *C01G 53/006* (2013.01); *C01G 53/42* (2013.01); *C01P 2002/85* (2013.01); *C01P 2004/03* (2013.01); *C01P 2004/61* (2013.01); *C01P 2006/11* (2013.01)

(58) Field of Classification Search
USPC .......................................... 429/223
See application file for complete search history.

(56) References Cited

U.S. PATENT DOCUMENTS

| | | |
|---|---|---|
| 2002/0061444 A1 | 5/2002 | Kweon et al. |
| 2007/0026314 A1 | 2/2007 | Kawasato et al. |
| 2009/0272940 A1 | 11/2009 | Kikuya et al. |

FOREIGN PATENT DOCUMENTS

| | | |
|---|---|---|
| JP | 2008-166269 A | 7/2008 |
| JP | 2009-298697 A | 12/2009 |
| JP | 2010-024083 A | 2/2010 |
| KR | 10-0277796 B1 | 10/2000 |
| KR | 10-2006-0132924 A | 12/2006 |
| KR | 10-0805910 B1 | 2/2008 |
| KR | 10-2009-0086198 A | 8/2009 |

*Primary Examiner* — Sarah A Slifka
(74) *Attorney, Agent, or Firm* — Lee & Morse, P.C.

(57) ABSTRACT

A nickel composite hydroxide for a lithium secondary battery represented by Formula 1 below with a small compositional variation in M:

$$Ni_{1-x-y-z}Co_xM_yMn_z(OH)_2 \quad (1),$$

where, in Formula 1, M is aluminum (Al), zirconium (Zr), titanium (Ti), magnesium (Mg), silicon (Si), or zinc (Zn), x is a number from 0 to 0.5, y is a number from 0.01 to 0.2, and z is a number from 0 to 0.5.

13 Claims, 9 Drawing Sheets

LITHIUM COMPOSITE OXIDE FOR A LITHIUM SECONDARY BATTERY AND POSITIVE ELECTRODE FOR A LITHIUM SECONDARY BATTERY INCLUDING THE LITHIUM COMPOSITE OXIDE

CROSS-REFERENCE TO RELATED APPLICATIONS

Korean Patent Application No. 10-2011-0111409, filed on Oct. 28, 2011, in the Korean Intellectual Property Office, and entitled: "Nickel Composite Hydroxide for a lithium secondary battery, Lithium Composite Oxide for a lithium secondary battery Prepared Using the Nickel Composite Hydroxide, Methods of Preparing the Nickel Composite Hydroxide and Lithium Composite Oxide, Positive Electrode for a lithium secondary battery that Includes the Lithium Composite Oxide, and Lithium Secondary Battery Including the Positive Electrode," is incorporated by reference herein in its entirety.

BACKGROUND

1. Field

Embodiments relate to a nickel composite hydroxide for a lithium secondary battery, a lithium composite oxide for a lithium secondary battery that is prepared using the nickel composite hydroxide, methods for preparing the nickel composite hydroxide and lithium composite oxide, a positive electrode for a lithium secondary battery that includes the lithium composite oxide, and a lithium secondary battery including the positive electrode.

2. Description of the Related Art

Recently, use of lithium secondary batteries in mobile phones, camcorders, and laptop computers has been rapidly increasing. The capacity of a lithium secondary battery may be influenced by a positive active material used there in the battery.

SUMMARY

An embodiment is directed to a nickel composite hydroxide for a lithium secondary battery represented by Formula 1 below with a small compositional variation in M:

$$Ni_{1-x-y-z}Co_xM_yMn_z(OH)_2 \qquad (1)$$

In Formula 1, M may be aluminum (Al), zirconium (Zr), titanium (Ti), magnesium (Mg), silicon (Si), or zinc (Zn), x may be a number from 0 to 0.5, y may be a number from 0.01 to 0.2, and z may be a number from 0 to 0.5.

M may be aluminum (Al).

In Formula 1, y may be from 0.01 to 0.1.

The nickel composite hydroxide may be $Ni_{0.80}Co_{0.15}Al_{0.05}(OH)_2$, $Ni_{0.80}Co_{0.10}Mn_{0.05}Al_{0.05}(OH)_2$, or $Ni_{0.9}Co_{0.05}Mn_{0.025}Al_{0.025}(OH)_2$.

M may have a compositional variation of about 2% or less as measured by energy dispersive spectroscopy (EDS).

The nickel composite hydroxide may have an average particle diameter of from about 5 μm to about 25 μm, and a tap density of from about 1.0 g/cm³ to about 3.0 g/cm³.

An embodiment is directed to a lithium composite oxide for a lithium secondary battery that is represented by Formula 2 below with a small compositional variation in M:

$$LiNi_{1-x-y-z}Co_xM_yMn_zO_2 \qquad (2)$$

In Formula 2, M may be aluminum (Al), zirconium (Zr), titanium (Ti), magnesium (Mg), silicon (Si), or zinc (Zn), x may be a number from 0 to 0.5, y may be a number from 0.01 to 0.2, and z may be a number from 0 to 0.5.

M may be aluminum (Al).

In Formula 2, y may be from 0.01 to 0.1.

The lithium composite oxide may be $LiNi_{0.80}Co_{0.15}Al_{0.05}O_2$, $LiNi_{0.80}Co_{0.10}Mn_{0.05}Al_{0.05}O_2$, or $LiNi_{0.9}Co_{0.05}Mn_{0.025}Al_{0.025}O_2$.

M may have a compositional variation of about 2% or less as measured by energy dispersive spectroscopy (EDS).

M may be Al, and a compositional variation in Al may be about 2% or less as measured by energy dispersive spectroscopy (EDS).

The lithium composite oxide may have an average particle diameter of from about 5 μm to about 25 μm, and a tap density of from about 1.0 g/cm³ to about 3.0 g/cm³.

An embodiment is directed to a method of preparing a nickel composite hydroxide for a lithium secondary battery, the method including mixing an M-containing compound, a chelating agent, and a first solvent to prepare a chelated M precursor mixture, preparing a nickel precursor, a second solvent, and, optionally, a cobalt precursor, to prepare a nickel-containing precursor mixture, and mixing the chelated M precursor mixture, the nickel-containing precursor mixture, a complexing agent, and a pH adjusting agent to prepare the nickel composite hydroxide represented by Formula 1 below:

$$Ni_{1-x-y-z}Co_xM_yMn_z(OH)_2 \qquad (1)$$

In Formula 1, M may be aluminum (Al), zirconium (Zr), titanium (Ti), magnesium (Mg), silicon (Si), or zinc (Zn), x may be a number from 0 to 0.5, y may be a number from 0.01 to 0.2, and z may be a number from 0 to 0.5.

The chelating agent may be at least one selected from the group of acetylacetone, ethylenediaminetetraacetic acid, and benzoylacetone.

The M-containing compound may be an aluminum alkoxide, a zirconium alkoxide, a titanium alkoxide, a magnesium alkoxide, a zinc alkoxide, a silicon alkoxide, or a mixture thereof.

An embodiment is directed to a method of preparing a lithium composite oxide for a lithium secondary battery, the method including: mixing a nickel composite hydroxide represented by Formula 1 and a lithium compound to prepare a mixture, and thermally treating the mixture to provide a lithium composite oxide represented by Formula 2:

$$Ni_{1-x-y-z}Co_xM_yMn_z(OH)_2 \qquad (1)$$

In Formula 1, M may be aluminum (Al), zirconium (Zr), titanium (Ti), magnesium (Mg), silicon (Si), or zinc (Zn), x may be a number from 0 to 0.5, y may be a number from 0.01 to 0.2, and z may be a number from 0 to 0.5.

$$LiNi_{1-x-y-z}Co_xM_yMn_zO_2 \qquad (2)$$

In Formula 2, M may be aluminum (Al), zirconium (Zr), titanium (Ti), magnesium (Mg), silicon (Si), or zinc (Zn), x may be a number from 0 to 0.5, y may be a number from 0.01 to 0.2, and z may be a number from 0 to 0.5.

The thermal treating may be performed at a temperature of about 700° C. to about 900° C.

An embodiment is directed to a positive electrode for a lithium secondary battery that includes the lithium composite oxide according to an embodiment.

An embodiment is directed to a lithium secondary battery including a positive electrode, a negative electrode, and a separator disposed between the positive electrode and the negative electrode, wherein the positive electrode is a positive electrode according to an embodiment.

BRIEF DESCRIPTION OF THE DRAWINGS

Features will become apparent to those of skill in the art by describing in detail example embodiments with reference to the attached drawings in which.

DETAILED DESCRIPTION

Figure 1:
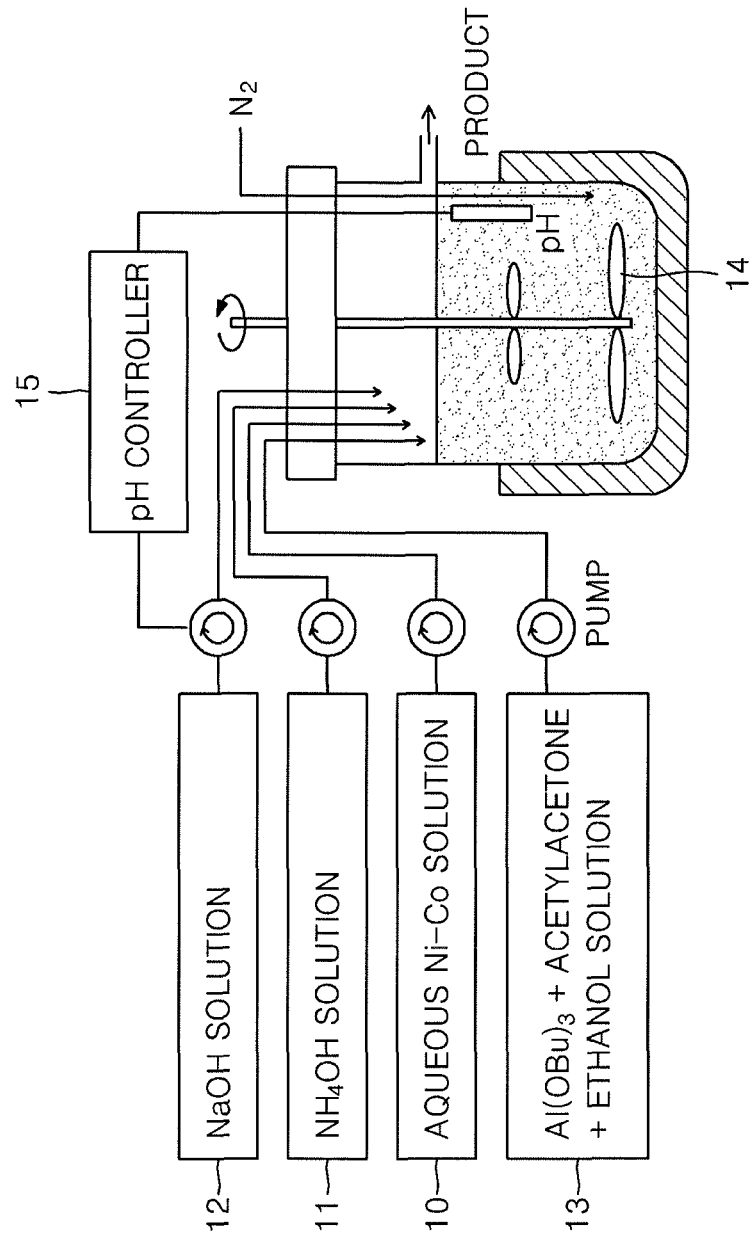
FIG. 1 illustrates a diagram of a co-precipitation reactor according to an embodiment.

Korean Patent Application No. 10-2011-0111409, filed on Oct. 28, 2011, in the Korean Intellectual Property Office, and entitled: "Nickel Composite Hydroxide for a lithium secondary battery, Lithium Composite Oxide for a lithium secondary battery Prepared Using the Nickel Composite Hydroxide, Methods of Preparing the Nickel Composite Hydroxide and Lithium Composite Oxide, Positive Electrode for a lithium secondary battery that Includes the Lithium Composite Oxide, and Lithium Secondary Battery Including the Positive Electrode," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Expressions such as "at least one of," when preceding a list of elements, modify the entire list of elements and do not modify the individual elements of the list.

Hereinafter, example embodiments of a nickel composite hydroxide, a lithium composite oxide prepared using the nickel composite hydroxide, methods of preparing the nickel composite hydroxide and lithium composite oxide, a positive electrode for a lithium secondary battery that includes the lithium composite oxide, and a lithium secondary battery using the positive electrode will now be described in greater detail.

In a general preparation of nickel cobalt aluminum hydroxide, when aluminum hydroxide as an aluminum precursor, a nickel precursor, and a cobalt precursor are mixed together to form a co-precipitate, the aluminum may react with ammonia that is added as a complexing agent, which inhibits forming nickel hydroxide having a high density and large particle size. This is attributable to increased generation of aluminum hydroxide by the reaction of ammonia and aluminum suppressing growth of nickel hydroxide particles and further generation of high-density, large-diameter nickel cobalt aluminum hydroxide.

According to an embodiment, the reactivity of aluminum may be appropriately controlled by using aluminum alkoxide, such as aluminum butoxide, as an M precursor of the Formula 1 together with acetylacetone as a chelating agent. This will now be described in more detail.

For a case where M is aluminum, when using aluminum butoxide (A) as an M precursor and acetylacetone (B) as a chelating agent, the acetylacetone substitutes a highly reactive butoxy group, which is an alkoxy ligand of the aluminum butoxide (A), as illustrated in Reaction Scheme 1 below. This is believed to suppress hydrolysis and condensation of a resultant aluminum precursor (C).

This may result in high-density, large-diameter nickel cobalt aluminum hydroxide co-precipitates in spherical particles. Furthermore, nickel cobalt aluminum composite oxide with high-density may be prepared using the nickel cobalt aluminum hydroxide co-precipitates.

Reaction Scheme 1

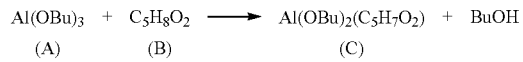

$$Al(OBu)_3 + C_5H_8O_2 \longrightarrow Al(OBu)_2(C_5H_7O_2) + BuOH$$
(A)　　　　(B)　　　　　　　　(C)

In Reaction Scheme 1, OBu indicates butoxide, and BuOH indicates butanol.

According to an embodiment, there is provided a nickel composite hydroxide for a lithium secondary battery represented by Formula 1 below with a small compositional variation in M:

$$Ni_{1-x-y-z}Co_xM_yMn_z(OH)_2 \qquad \text{Formula 1}$$

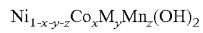

The term "compositional variation in M" means distributional homogeneity of M, which is measurable by energy dispersive spectroscopy (EDS) mapping. For example, a compositional variation in M of about 2% or less refers to a standard deviation of EDS mapping data of about 2% or less.

In Formula 1, M may be aluminum (Al), zirconium (Zr), titanium (Ti), magnesium (Mg), silicon (Si), or zinc (Zn), x may be a number from 0 to 0.5, y may be a number from 0.01 to 0.2, and z may be a number from 0 to 0.5.

In Formula 1, x may be a number from 0.05 to 0.15. In Formula 1, y may be a number from 0.01 to 0.1. In an implementation, y may be a number from 0.01 to 0.05.

In Formula 1, z may be 0 or a number from 0.025 to 0.5. In Formula 1, z may be a number from 0.025 to 0.05.

The nickel composite hydroxide of Formula 1 may be, e.g., $Ni_{0.80}Co_{0.15}Al_{0.05}(OH)_2$, $Ni_{0.80}Co_{0.10}Mn_{0.05}Al_{0.05}(OH)_2$, or $Ni_{0.9}Co_{0.05}Mn_{0.025}Al_{0.025}(OH)_2$.

According to another embodiment, there is provided a lithium composite oxide for a lithium secondary battery which is represented by Formula 2 below with a small compositional variation in M:

$$LiNi_{1-x-y-z}Co_xM_yMn_zO_2 \quad \text{Formula 2}$$

In Formula 2, M may be Al, Zr, Ti, Mg, Si, or Zn, x may be a number from 0 to 0.5, y may be a number from 0.01 to 0.2, and z may be a number from 0 to 0.5.

In Formula 2, x may be a number from 0.05 to 0.15. In Formula 2, y may be a number from 0.01 to 0.1. In an implementation, y may be a number from 0.01 to 0.05.

In Formula 2, z may be 0 or a number from 0.025 to 0.5.

In Formula 1, z may be a number from 0.025 to 0.05.

The lithium composite oxide of Formula 2 may be, e.g., $LiNi_{0.80}Co_{0.15}Al_{0.05}O_2$, $LiNi_{0.80}Co_{0.10}Mn_{0.05}Al_{0.05}O_2$, or $LiNi_{0.9}Co_{0.05}Mn_{0.025}Al_{0.025}O_2$.

In some embodiments, M may be, e.g., aluminum (Al), in the nickel composite hydroxide of Formula 1 and the lithium composite oxide of Formula 2, both having a small compositional variation in M.

In an embodiment, compositional variations in the nickel composite hydroxide and lithium composite oxide may be found by EDS analysis and mapping from randomly chosen 20 points for the components nickel, cobalt, and M (for example, aluminum). The EDS compositional analysis is not limited to the 20 random points, and in some embodiments, may be performed using more than or less than 20 random points.

A beam diameter in EDS analysis may be from about 0.05 µm to about 0.15 µm, and, in another embodiment, may be about 0.1 µm.

In the nickel composite hydroxide of Formula 1 and the lithium composite oxide of Formula 2, a compositional variation in M may be about 2% or less, and in some embodiments, may be about 1% or less.

In the nickel composite hydroxide of Formula 1 and the lithium composite oxide of Formula 2, a compositional variation in M may be about 0.5% or less, and in some embodiments, may be from about 0.3% to about 0.4%.

In the nickel composite hydroxide of Formula 1, M may be aluminum and a compositional variation in M may be about 2% or less, and in some embodiments, may be about 1% or less.

In the nickel composite hydroxide of Formula 1, a composition variation in aluminum may be 0.5% or less, and in some embodiments, may be from about 0.3% to about 0.4%.

In the lithium composite oxide of Formula 2, M may be aluminum and a compositional variation in the aluminum may be from about 2% or less, and in some embodiments, may be from about 1% or less.

In the lithium composite oxide of Formula 2, a compositional variation in Al may be from about 0.5% or less, and in some embodiments, may be from about 0.3% to about 0.4%.

The nickel composite hydroxide of Formula 1 may have an average particle diameter of about 5 µm or greater, and, in some embodiments, may have an average particle diameter of from about 5 µm to about 25 µm, and, in some other embodiments, may have an average particle diameter of from about 10 µm to about 25 µm. The nickel composite hydroxide of Formula 1 may have improved density characteristics, and, in some embodiments, may have a tap density of from about 1.0 g/cm³ to about 3.0 g/cm³.

The lithium composite oxide of Formula 2 may have an average particle diameter of about 5 µm or greater, and, in some embodiments, may have an average particle diameter of from about 5 µm to about 25 µm, and, in some other embodiments, may have an average particle diameter of from about 10 µm to about 25 µm. The lithium composite oxide may have improved density characteristics, like the nickel composite hydroxide, and, in some embodiments, may have a tap density of from about 1.0 g/cm³ to about 3.0 g/cm³.

The nickel composite hydroxide of Formula 1 and the lithium composite oxide of Formula 2 may be spherical particles. The term "spherical" means not only spherical shape but also any sphere-like shape, e.g., a circular or elliptical shape.

Hereinafter, methods of preparing the nickel composite hydroxide of Formula 1 and the lithium composite oxide of Formula 2 will be described.

First, an M-containing compound, a chelating agent, and a first solvent may be mixed together to prepare a chelated M precursor mixture.

The M-containing compound may be, e.g., aluminum alkoxide, zirconium alkoxide, titanium alkoxide, magnesium alkoxide, zinc alkoxide, silicon alkoxide, or a mixture thereof. The aluminum alkoxide may include, e.g., aluminum butoxide, aluminum ethoxide, aluminum methoxide, or a combination thereof.

The amount of the M-containing compound may be stoichiometrically controlled to obtain the nickel composite hydroxide of Formula 1.

The chelating agent reacts with the M-containing compound to form the chelated M precursor, and, thus, may control reactivity of M (for example, aluminum).

The chelating agent may be, e.g., acetylacetone, ethylenediaminetetraacetic acid (EDTA), benzoylacetone (BzAc), or a combination thereof.

The amount of the chelating agent may be from about 0.1 mole to 3 moles based on 0.1 mole of the M-containing compound. When the amount of the chelating agent is within this range, the reactivity of M may be appropriately controlled to obtain a nickel composite hydroxide having a desired density, a desired particle diameter, and a desired compositional variation.

The first solvent may include, e.g., ethanol, propanol, or a combination thereof. The amount of the first solvent may be from about 400 parts to about 9900 parts by weight based on 100 parts by weight of the M-containing compound. When the amount of the first solvent is within this range, a chelated M precursor compound with the components uniformly mixed may be obtained.

Separate from the chelated M precursor mixture described above, a nickel precursor, a cobalt precursor, and a second solvent may be mixed together to prepare a nickel cobalt precursor mixture. In an embodiment, the nickel precursor and the second solvent may be mixed to prepare a nickel-containing precursor mixture.

The nickel precursor may include, e.g., nickel sulfate, nickel chloride, nickel nitrate, or a combination thereof.

The cobalt precursor may include, e.g., cobalt sulfate, cobalt chloride, cobalt nitrate, or a combination thereof.

The amounts of the nickel precursor and the cobalt precursor may be stoichiometrically controlled to obtain the nickel composite hydroxide of Formula 1.

The second solvent may include, e.g., water, ethanol, or a combination thereof. The amount of the second solvent may be from about 100 parts to about 9900 parts by weight based on 100 parts by weight of the nickel precursor.

The M precursor mixture and the nickel cobalt precursor mixture may be mixed together, and a complexing agent and a pH adjusting agent may be further added to the mixture and mixed together.

The complexing agent may include, e.g., ammonia water, which serves as an ammonium ion source.

The pH adjusting agent may include, e.g., at least one of sodium hydroxide, potassium hydroxide, lithium hydroxide, and aqueous solutions thereof.

The pH of the mixture may be adjusted to be alkaline, e.g., from about 9.0 to about 13.5, by varying the amount of the pH adjusting agent.

The pH-adjusted mixture may be precipitated, washed, and then dried, thereby obtaining the nickel composite hydroxide of Formula 1. The washing may be performed using, e.g., pure water.

The nickel composite hydroxide may then be mixed with a lithium compound and thermally treated to obtain the lithium composite oxide of Formula 2.

The lithium compound may include, e.g., lithium hydroxide, lithium fluoride, lithium carbonate, or a mixture thereof. The amount of the lithium compound may be stoichiometrically controlled to obtain the nickel composite hydroxide of Formula 1.

The thermal treatment may be performed at a temperature of, e.g., about 700° C. to about 900° C. When the thermal treatment is performed within this temperature range, forming a lithium composite oxide for a lithium secondary battery with improved capacity and lifetime characteristics may be facilitated.

The thermal treatment may be performed in an inert gas atmosphere. The inert gas may include, e.g., nitrogen gas, argon gas, or a combination thereof.

FIG. 1 illustrates a diagram of a co-precipitation reactor according to an embodiment.

A method of preparing the nickel composite hydroxide represented by Formula 1 according to an embodiment will now be described with reference to FIG. 1.

In the following example, nickel sulfate is used as the nickel precursor, and cobalt sulfate and aluminum butoxide are used as the cobalt precursor and aluminum precursor, respectively.

An aqueous Ni—Co solution 10 (of nickel sulfate and cobalt sulfate dissolved in water), an aqueous ammonia solution 11, an aqueous sodium hydroxide solution 12, and an aluminum solution 13 (including aluminum butoxide and acetylacetone dissolved in ethanol) may be fed into a reaction bath 14 via separate constant speed pumps.

A slurry in the reaction bath 14 may be agitated at a high speed while being purged with nitrogen to prevent oxidization in the reaction bath 14. The added amount of the aqueous sodium hydroxide solution 12 may be adjusted in connection with a pH controller 15. A resultant co-precipitated slurry may be washed with water and dried, thereby resulting in a target nickel cobalt aluminum hydroxide.

As described above, acetylacetone may be used as a chelating agent to suppress reactivity of aluminum. The chelating agent may also control a sol-gel reaction rate of the aluminum precursor. The lowered reaction rate of the sol-gel reaction may enable rapid generation of more aluminum hydroxide nuclei, and facilitate growth of nickel hydroxide particles. The reactivity control of M, e.g., aluminum, by using the chelating agent along with the use of ammonia as a complexing agent helps to prepare high-density, large particle diameter nickel composite hydroxide in spherical particles. As illustrated in FIG. 1, the aluminum solution 13 is supplied into the reaction bath 14 separately from the aqueous Ni—Co solution 10 of nickel sulfate and cobalt sulfate. Thus, the amount of aluminum to be added may be readily controlled by changing the flow rate of the aluminum solution 13 into the reaction bath 14.

In an embodiment, the lithium composite oxide of Formula 2 may be used as a positive active material in a lithium secondary battery.

Using the lithium composite oxide, an electrode with improved density and capacity characteristics may be manufactured. This electrode may be used to manufacture a lithium secondary battery with improved lifetime characteristics.

Hereinafter, a method of manufacturing a lithium secondary battery using the lithium composite oxide of Formula 2 as a positive active material according to an embodiment will be described. The lithium secondary battery may include a positive electrode, a negative electrode, a lithium salt-containing non-aqueous electrolyte, and a separator.

The positive electrode and the negative electrode may be fabricated by respectively coating a positive active material layer composition and a negative active material layer composition on respective current collectors, and drying the resulting products.

The positive active material layer composition may be prepared by mixing a positive active material, a conducting agent, a binder, and a solvent. The positive active material may be the lithium composite oxide of Formula 2.

The binder may facilitate binding components (such as the positive active material and the conducting agent), and binding of the positive active material layer composition to the current collector. The amount of the binder may be, e.g., from about 1 part to about 50 parts by weight based on 100 parts by weight of the total weight of the positive active material. The binder may include, e.g., polyvinylidene difluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber, fluoro rubber, various copolymers, and combinations thereof. The amount of the binder may be, e.g., from about 2 parts to about 100 parts by weight based on 100 parts by weight of the total weight of the positive active material. When the amount of the binder is within this range, the positive active material layer may bind strongly to the current collector.

The conducting agent may be any suitable material that has an appropriate conductivity without causing chemical changes in the fabricated battery. The conducting agent may include, e.g., graphite such as natural or artificial graphite; carbonaceous materials such as carbon black, acetylene black, ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; other conductive materials such as polyphenylene derivatives; and combinations thereof.

The amount of the conducting agent may be, e.g., from about 2 parts to about 5 parts by weight based on 100 parts by weight of the total weight of the positive active material. When the amount of the conducting agent is within this range, the positive electrode may have better conductive characteristics.

The solvent may include, e.g., N-methylpyrrolidone (NMP). The amount of the solvent may be, e.g., from about 1 part to about 10 parts by weight based on 100 parts by weight of the positive active material. When the amount of the solvent is within this range, forming the positive active material layer may be facilitated.

A positive electrode current collector may be fabricated to have a thickness of from about 3 μm to about 500 μm, and may be any suitable current collector that has high conductivity without causing chemical changes in the fabricated battery. Examples of the positive electrode current collector include stainless steel, aluminum, nickel, titanium, thermal-treated carbon, and aluminum or stainless steel that is surface-treated with carbon, nickel, titanium, or silver. The positive electrode current collector may be processed to have fine irregularities on a surface thereof so as to enhance an adhesive strength of the current collector to the positive active material. The positive electrode current collector may be in various forms, including, e.g., a film, a sheet, a foil, a net, a porous structure, a foam, a non-woven fabric, or a combination thereof.

A composition for forming a negative active material layer may be prepared using a negative active material, a binder, a conducting agent, and a solvent together.

The negative active material may be a material that allows intercalation and deintercalation of lithium ions. Examples of the negative active material include carbon and carbon-based materials such as graphite, lithium metal, lithium alloys, silicon oxide-based materials, and combinations thereof. In an embodiment, the negative active material may include silicon oxide.

The amount of the binder may be, e.g., from about 1 part to about 50 parts by weight based on 100 parts by weight of the total weight of the negative active material. Examples of the binder include those described above in connection with the positive electrode.

The amount of the conducting agent may be, e.g., from about 1 part to about 5 parts by weight based on 100 parts by weight of the negative active material. When the amount of the conducting agent is within this range, the negative electrode may have good conductive characteristics.

The amount of the solvent may be, e.g., from about 1 part to about 10 parts by weight based on 100 parts by weight of the negative active material. When the amount of the solvent is within this range, forming the negative active material layer may be facilitated.

The same kinds of conducting agents and solvents as those used in the positive electrode may be used.

A negative electrode current collector may be fabricated to have a thickness of about 3 μm to about 500 μm. The negative electrode current collector may be any suitable material that has an appropriate conductivity without causing chemical changes in the fabricated battery. Examples of the negative electrode current collector include copper, stainless steel, aluminum, nickel, titanium, thermal-treated carbon, copper or stainless steel that is surface-treated with carbon, nickel, titanium or silver, aluminum-cadmium alloys, and combinations thereof. In addition, similar to the positive electrode current collector, the negative electrode current collector may be processed to have fine irregularities on a surface thereof so as to enhance the adhesive strength of the negative electrode current collector to the negative active material, and may be used in any of various forms, including a film, a sheet, a foil, a net, a porous structure, foam, and non-woven fabric.

The separator may be disposed between the positive and negative electrodes manufactured according to the processes described above. The separator may have a pore diameter of, e.g., about 0.01 to about 10 μm and a thickness of about 5 to about 300 μm. Examples of the separator include olefin-based polymers, such as polypropylene or polyethylene, a glass fiber sheet, a non-woven fabric, and combinations thereof. When a solid electrolyte, e.g., a polymer electrolyte, is employed, the solid electrolyte may also serve as the separator.

The lithium salt-containing non-aqueous electrolyte may be composed of a non-aqueous electrolyte solution and a lithium salt. The non-aqueous electrolyte may be, e.g., a non-aqueous liquid electrolyte, an organic solid electrolyte, or an inorganic solid electrolyte.

Examples of the non-aqueous liquid electrolyte include any suitable aprotic organic solvent such as N-methyl-2-pyrrolidone, propylene carbonate, ethylene carbonate (EC), butylene carbonate, dimethyl carbonate, diethyl carbonate (DEC), fluoroethylene carbonate (FEC), γ-butyrolactone, 1,2-dimethoxyethane, tetrahydroxyfurane, 2-methyl tetrahydrofuran, dimethylsulfoxide, 1,3-dioxolane, formamide, dimethylformamide, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, and combinations thereof.

Examples of the organic solid electrolyte include polyethylene derivatives, polyethylene oxide derivatives, polypropylene oxide derivatives, phosphoric acid ester polymers, polyester sulfide, polyvinyl alcohols, polyvinylidene fluoride, and combinations thereof. Examples of the inorganic solid electrolyte include nitrides, halides, and sulfates of lithium such as $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$, and combinations thereof.

The lithium salt may be any suitable lithium salt that is soluble in the above-mentioned non-aqueous electrolyte. Examples of the lithium salt include $LiCl$, $LiBr$, $LiI$, $LiClO_4$, $LiBF_4$, $LiB_{10}Cl_{10}$, $LiPF_6$, $LiCF_3SO_3$, $LiCF_3Co_2$, $LiAsF_6$, $LiSbF_6$, $LiAlCl_4$, $CH_3SO_3Li$, $CF_3SO_3Li$, $(CF_3SO_2)_2NLi$, lithium chloroborate, lithium lower aliphatic carboxylate, lithium tetraphenyl borate, lithium imide, and combinations thereof.

Figure 2:
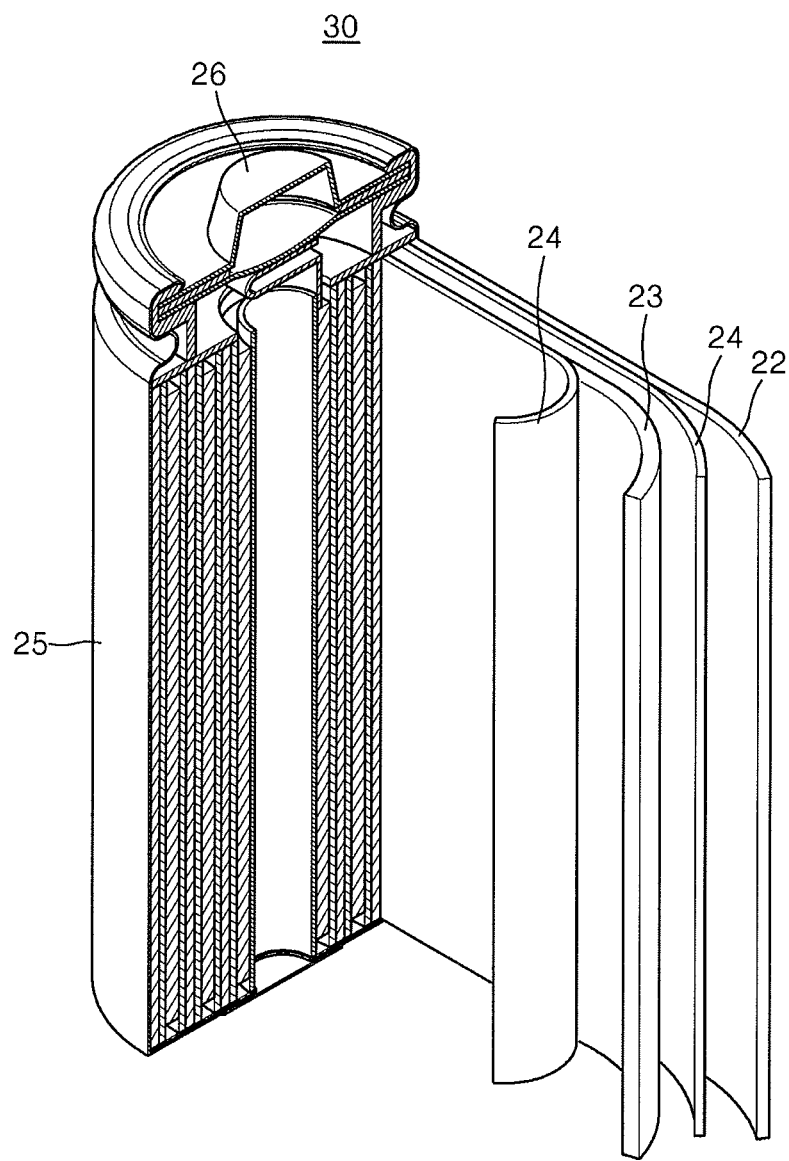
FIG. 2 illustrates a schematic view of a lithium secondary battery according to an embodiment.

FIG. 2 illustrates a schematic perspective view of a lithium secondary battery 30 according to an embodiment.

In the example embodiment shown in FIG. 2, the lithium secondary battery 30 includes an electrode assembly having a positive electrode 23 that contains the above-described lithium composite oxide, a negative electrode 22, and a separator 24 between the positive electrode 23 and the negative electrode 22. The electrode assembly is contained within a battery case 25, and a sealing member 26 seals the battery case 25. An electrolyte (not shown) is injected into the battery case 25 to impregnate the electrode assembly. The lithium secondary battery 30 may be manufactured by sequentially stacking the positive electrode 23, the negative electrode 22, and the separator 24 on one another to form a stack, rolling the stack into a spiral form, and inserting the rolled up stack into the battery case 25. The battery case 25 may be sealed with the sealing member 26, thereby completing the manufacture of the lithium secondary battery 30.

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

PREPARATION EXAMPLE 1

Preparation of Nickel Composite Hydroxide and Lithium Composite Oxide 7.36 kg of nickel sulfate ($NiSO_4 \cdot 6H_2O$) and 1.48 kg of cobalt sulfate ($CoSO_4 \cdot 7H_2O$) were dissolved in 10.51 kg of water to prepare a transition metal solution. 4 kg of NaOH was dissolved in 11.38 kg of water to prepare a sodium hydroxide solution.

170 g of aluminum butoxide and 138 g of acetylacetone were dissolved in 400 g of ethanol to prepare an aluminum solution. These three solutions and ammonia water were fed into a 5 L reaction bath via separate pumps. The pump rates were controlled to a 100% metal/ammonia ratio by mole and a 5% Al/(Al+Ni+Co) ratio by mole.

"The 100% metal/ammonia ratio by mole" means that an equal mole number of ammonia as to a total mole number of nickel sulfate, cobalt sulfate, and aluminum butoxide was used. "The 5% Al/(Al+Ni+Co) ratio by mole" means that 5 moles of aluminum butoxide were used based on 100 moles of the total mole number of aluminum butoxide, nickel sulfate, and cobalt sulfate.

The combined solutions in the reaction bath were agitated at about 600 rpm at a temperature maintained at about 50° C. The amount of the sodium hydroxide solution fed was automatically adjusted using a pH controller to a pH of 12.3. A resultant solution in slurry was precipitated, washed with pure water, and dried to obtain a $Ni_{0.80}Co_{0.15}Al_{0.05}(OH)_2$ (hereinafter, "NCA") co-precipitate.

100 g of the co-precipitate was mixed with 47.6 g of LiOH—$H_2O$ and heated for about 10 hours at temperature variations from about 700° C. to about 900° C. to obtain $LiNi_{0.80}Co_{0.15}Al_{0.05}O_2$ ("LNCA").

COMPARATIVE PREPARATION EXAMPLE 1

Preparation of Nickel Composite Hydroxide and Lithium Composite Oxide

A nickel composite hydroxide $Ni_{0.801}Co_{0.146}Al_{0.053}(OH)_2$ and a lithium composite oxide $LiNi_{0.801}Co_{0.146}Al_{0.053}O_2$ were obtained in the same manner as in Preparation Example 1, except that 0.66 kg of aluminum nitrate was used instead of the aluminum solution of aluminum butoxide and acetylacetone dissolved in ethanol.

COMPARATIVE PREPARATION EXAMPLE 2

Preparation of Nickel Composite Hydroxide and Lithium Composite Oxide

A nickel composite hydroxide co-precipitate $Ni_{0.801}Co_{0.146}(OH)_2$ ("NC") was obtained in the same manner as in Preparation Example 1, except that the aluminum solution of aluminum butoxide and acetylacetone dissolved in ethanol was not used.

90.11 g of the co-precipitate was mixed with 47.6 g of LiOH—$H_2O$ and 2.89 g of aluminum oxide in a dry condition and heated in the same conditions as in Preparation Example 1 to obtain a lithium composite oxide $LiNi_{0.801}Co_{0.146}Al_{0.053}O_2$ ("LCNA").

EXAMPLE 1

Manufacture of a Positive Electrode and a Lithium Secondary Battery Including the Positive Electrode 97.4 g of the LNCA of Preparation Example 1 as a positive active material, 1.9 g of polyvinylidene fluoride, and 1.3 g of carbon black were dispersed in 33 g of N-methylpyrrolidone to prepare a positive active material layer composition.

In the positive active material layer composition a mixed ratio of the positive active material, polyvinylidene fluoride, and carbon black was 97.4:1.3:1.3 by weight.

The positive active material layer composition was coated on an aluminum (Al) foil to form a thin positive electrode plate having a thickness of 12 which was then dried at about 135° C. for about 3 hours or longer, and then pressed to manufacture a positive electrode.

Separate from the positive active material layer composition, 96 g of graphite, 2 g of styrene-butadiene rubber (SBR) as a binder, and 2 g of carboxymethylcellulose ("CMA") as a thickening agent were dispersed in 150 g of water to prepare a negative active material layer composition.

The negative active material layer composition was coated on a copper (Cu) foil to form a thin negative electrode plate having a thickness of 8 μm, which was then dried at about 135° C. for about 3 hours or longer, and then pressed to manufacture a negative electrode.

The positive electrode and the negative electrode, with a porous polyethylene (PE) film separator (having a thickness of about 16 μm) disposed therebetween, were assembled to form a battery assembly, which was then rolled up, pressed, and placed into a rectangular battery case.

Then, an electrolytic solution was injected into the battery case, thereby manufacturing a lithium secondary battery. The electrolytic solution used was a solution of 1.1 M $LiPF_6$ dissolved in a solvent mixture of ethylene carbonate (EC), ethylmethyl carbonate (EMC), 4-fluorobenzene (FB), and dimethyl carbonate (DMC) in a volume ratio of 3:5:1:1.

COMPARATIVE EXAMPLES 1-2

Manufacture of a Positive Electrode and a Lithium Secondary Battery Including the Positive Electrode A positive electrode and a lithium secondary battery were manufactured in the same manner as in Example 1, except that the lithium composite oxide of Comparative Preparation Examples 1-2 were used instead of the lithium composite oxide of Preparation Example 1.

EVALUATION EXAMPLE 1

Average Particle Diameter Analysis of Nickel Composite Hydroxide

Average particle diameters of the nickel composite hydroxides and lithium composite oxides prepared according to Preparation Example 1 and Comparative Preparation Example 1 were measured. The results are shown in Table 1.

The average particle diameters were measured using a laser diffraction particle size analyzer (LS13320, available from Beckmann).

TABLE 1

| Example | Average particle diameter of nickel composite hydroxide (μm) | Average particle diameter of lithium composite oxide (μm) |
|---|---|---|
| Preparation Example 1 | 12.7 | 12.3 |
| Comparative Preparation Example 1 | 3.8 | 3.5 |

EVALUATION EXAMPLE 2

Scanning Electron Microscopic (SEM) Analysis

1) SEM Analysis of Nickel Composite Hydroxide

Figure 3A:
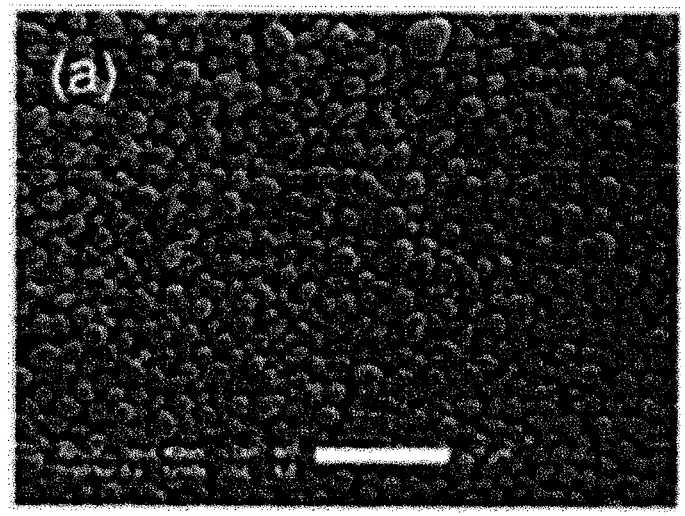
FIGS. 3A to 3F illustrate scanning electron microscopic (SEM) images of nickel cobalt aluminum hydroxide (NCA) co-precipitates prepared in Preparation Example 1 and Comparative Preparation Examples 1 and 2.
Figure 3B:
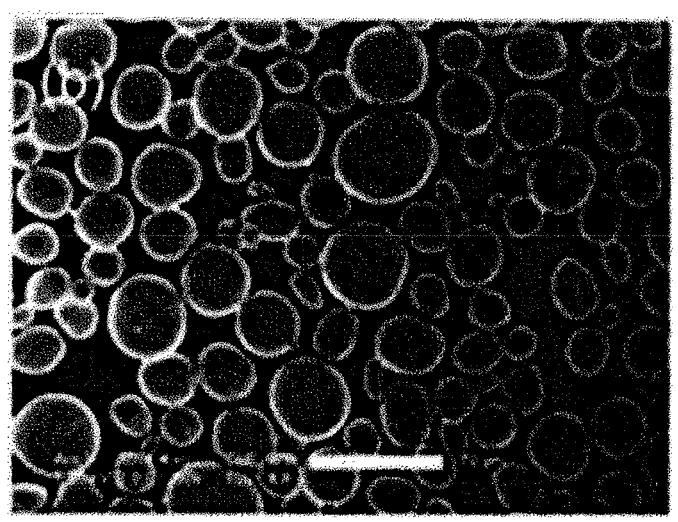
Figure 3C:
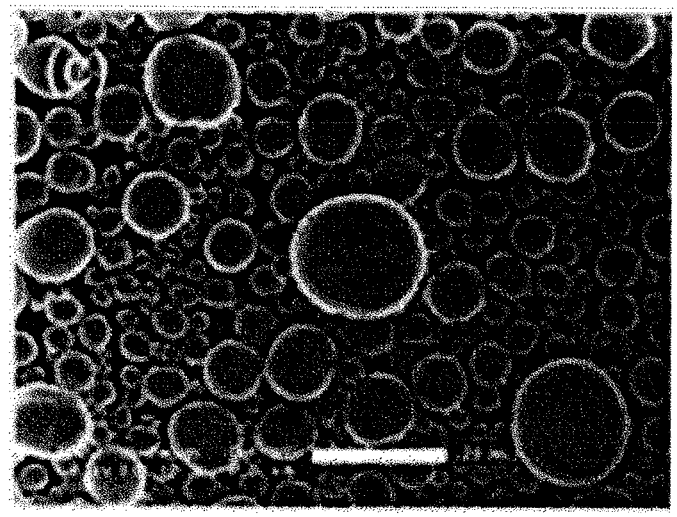
Figure 3D:
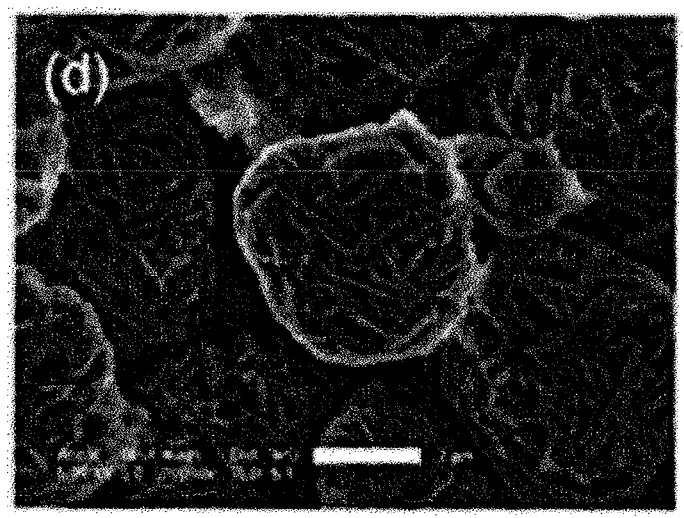
Figure 3E:
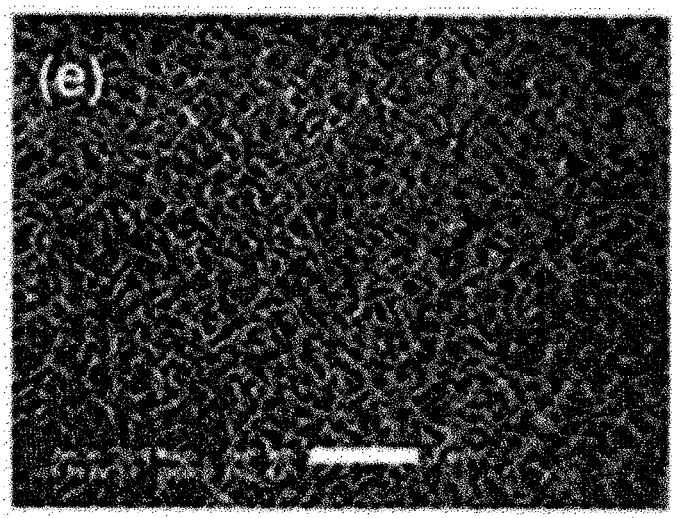
Figure 3F:
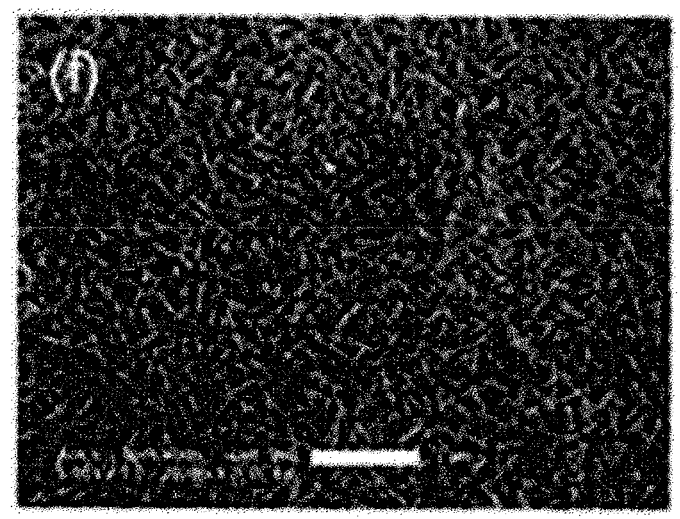

Particle shapes of the nickel composite hydroxides of Preparation Example 1 and Comparative Preparation Example 1-2 were analyzed using SEM. The results are shown in FIGS. 3A-3F. In FIGS. 3A-3F, a scale bar length is about 20 μm. FIGS. 3A and 3D are SEM images of the nickel composite hydroxide of Comparative Preparation Example 1, FIGS. 3B and 3E are SEM images of the nickel composite hydroxide of Preparation Example 1, and FIGS. 3C and 3F are SEM images of the nickel composite hydroxide of Comparative Preparation Example 2.

Referring to FIGS. 3A-3F, the nickel composite hydroxide of Preparation Example 1 was found to have better average particle size and density characteristics than those of Comparative Examples 1 and 2.

2) SEM Analysis of Lithium Composite Oxide

Figure 4A:
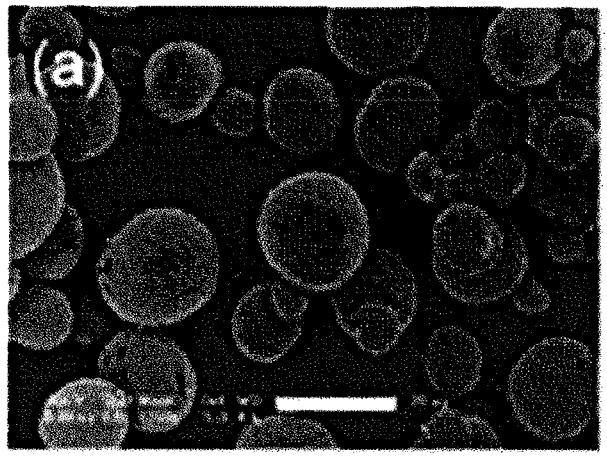
FIGS. 4A and 4B illustrate SEM images of lithium cobalt nickel aluminum oxides (LCNA) prepared in Preparation Example 1 and Comparative Preparation Example 2.
Figure 4B:
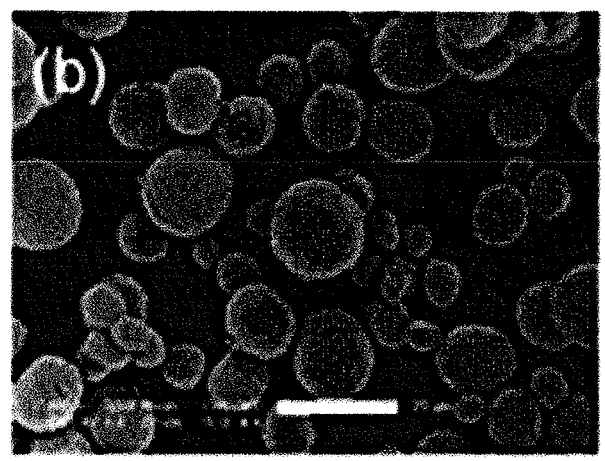

The lithium composite oxides of Preparation Example 1 and Comparative Preparation Example 2 were analyzed using SEM. The results are shown in FIGS. 4A and 4B.

EVALUATION EXAMPLE 3

EDS Mapping Analysis

EDS mapping was performed using an EDS analyzer (6360F, available from JEOL Ltd.) with a beam size of about 0.1 μm.

1) EDS Mapping Analysis of Nickel Composite Hydroxide

Figure 5A:
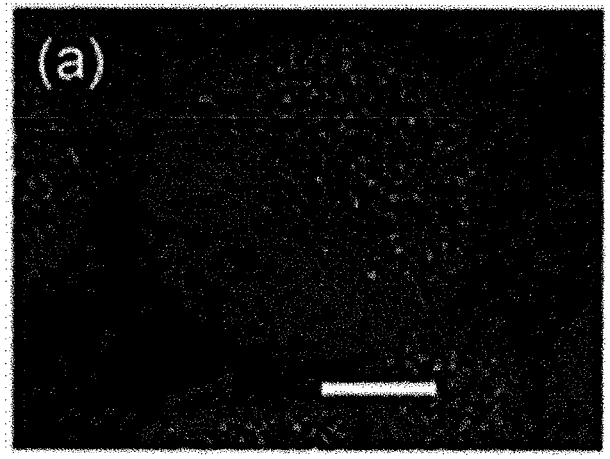
FIGS. 5A and 5B illustrate energy dispersive spectroscopy (EDS) analysis results on the NCA co-precipitate according to Preparation Example 1.
Figure 5B:
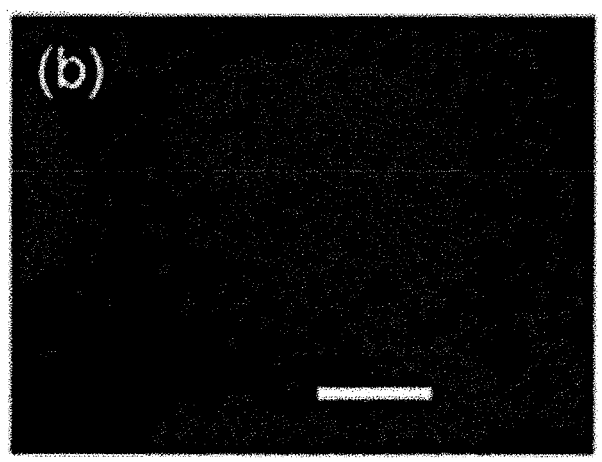

Nickel and aluminum distributions in the NCA co-precipitate of Preparation Example 1 were analyzed using EDS mapping. The results are shown in FIGS. 5A and 5B. Referring to FIGS. 5A and 5B, the nickel composite hydroxide of Preparation Example 1 is found to have very uniform distributions of nickel and aluminum.

2) EDS Mapping Analysis of Lithium Composite Oxide

Aluminum distributions in the lithium composite oxides of Preparation Example 1 and Comparative Preparation Example 2 were analyzed using EDS mapping. The results are shown in FIGS. 6A and 6B.

Figure 6A:
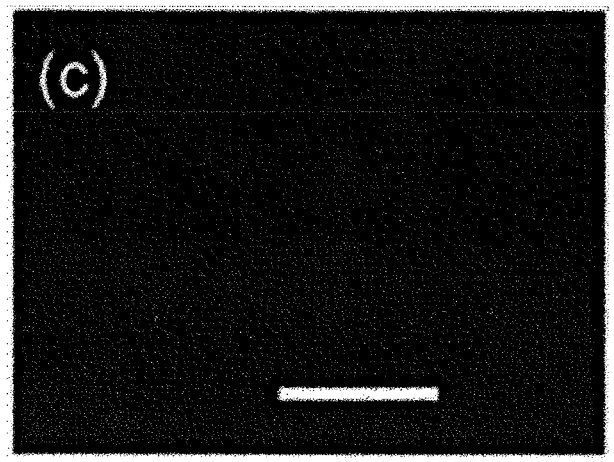
FIGS. 6A and 6B illustrate EDS analysis results on the LNCAs according to Preparation Example 1 and Comparative Preparation Example 2.
Figure 6B:
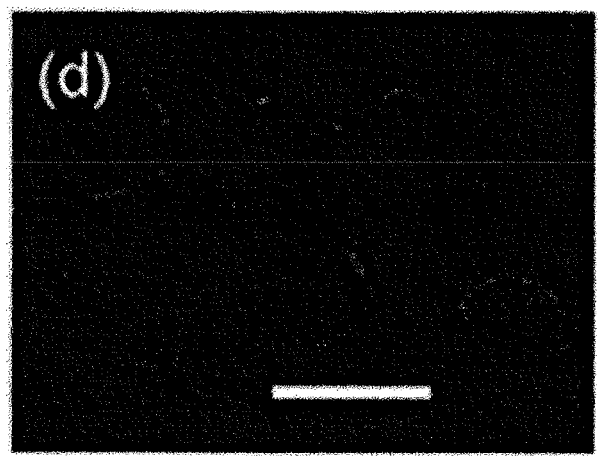

Referring to FIGS. 6A and 6B, the lithium composite oxide of Preparation Example 1 was found to have a smaller compositional variation in Al than that of Comparative Preparation Example 2. Compositions of the LNCA of Preparation Example 1 and Comparative Preparation Example 2 were analyzed with respect to randomly chosen 20 points using EDS mapping with a beam size of 0.1 μm in diameter.

The analysis results are shown in Table 2 below.

TABLE 2

|  | Preparation Example 1 | | | Comparative Preparation Example 2 | | | |
| --- | --- | --- | --- | --- | --- | --- | --- |
|  | Ni | Co | Al |  | Ni | Co | Al |
| 1 | 79.9% | 15.5% | 4.6% | 1 | 77.5% | 16.3% | 6.2% |
| 2 | 81.3% | 14.3% | 4.4% | 2 | 79.2% | 15.5% | 5.3% |
| 3 | 79.4% | 15.5% | 5.1% | 3 | 80.8% | 17.0% | 2.2% |
| 4 | 79.3% | 15.7% | 5.0% | 4 | 80.3% | 17.0% | 2.7% |
| 5 | 79.3% | 15.9% | 4.8% | 5 | 79.4% | 16.1% | 4.5% |
| 6 | 78.7% | 16.0% | 5.3% | 6 | 78.0% | 15.0% | 7.0% |
| 7 | 79.2% | 15.2% | 5.6% | 7 | 78.7% | 15.5% | 5.8% |
| 8 | 76.9% | 17.0% | 6.1% | 8 | 79.0% | 15.5% | 5.5% |
| 9 | 79.9% | 14.9% | 5.2% | 9 | 78.1% | 17.5% | 4.4% |
| 10 | 79.0% | 15.3% | 5.7% | 10 | 79.1% | 17.2% | 3.7% |
| 11 | 79.4% | 15.5% | 5.1% | 11 | 80.0% | 17.0% | 3.0% |
| 12 | 78.8% | 15.9% | 5.3% | 12 | 77.7% | 19.5% | 2.8% |
| 13 | 79.5% | 15.6% | 4.9% | 13 | 75.0% | 12.7% | 12.3% |
| 14 | 78.3% | 16.2% | 5.5% | 14 | 76.0% | 13.2% | 10.8% |
| 15 | 77.9% | 17.3% | 4.8% | 15 | 78.7% | 12.9% | 8.4% |
| 16 | 80.0% | 14.8% | 5.2% | 16 | 79.7% | 14.0% | 6.3% |
| 17 | 79.8% | 15.2% | 5.0% | 17 | 81.5% | 15.3% | 3.2% |
| 18 | 79.4% | 15.4% | 5.2% | 18 | 80.6% | 16.7% | 2.7% |
| 19 | 79.6% | 15.5% | 4.9% | 19 | 79.6% | 17.2% | 3.2% |
| 20 | 78.5% | 16.2% | 5.3% | 20 | 78.7% | 18.7% | 2.6% |
| Average | 79.2% | 15.6% | 5.2% | Average | 78.9% | 16.0% | 5.1% |
| Std. Dev. | 0.9% | 0.7% | 0.4% | Std. Dev. | 1.6% | 1.8% | 2.8% |

Referring to Table 2 above, the lithium composite oxide of Preparation Example 1 was found to have a smaller compositional variation in aluminum than that of Comparative Preparation Example 2. This indicates that distribution of aluminum is more uniform in the lithium composite oxide of Preparation Example 1 than in that of Comparative Preparation Example 2.

EVALUATION EXAMPLE 4

Tap Density Measurement of Nickel Composite Hydroxide and Lithium Composite Oxide Tap densities of the nickel composite hydroxides and lithium composite oxides of Preparation Example 1 and Comparative Preparation Example 1 were measured. Tap density is an increased bulk density attained after mechanically tapping a container containing the powder sample. Tapped density was obtained by mechanically tapping a 500 ml graduated measuring cylinder containing a powder sample 500 times at 150 revolutions per minute. After observing the initial powder volume and weight, the measuring cylinder was mechanically tapped, and volume and weight readings were measured. The mechanical tapping was achieved by raising the cylinder and allowing it to drop under its own weight a specified distance. The results are shown in Table 3 below.

TABLE 3

| Example | Tap density of nickel composite hydroxide (g/cm$^3$) | Tap density of LNCA (g/cm$^3$) |
| --- | --- | --- |
| Preparation Ex. 1 | 1.88 | 2.66 |
| Comparative Preparation Ex. 1 | 1.24 | 1.98 |

Referring to Table 3 above, the nickel composite hydride and lithium composite oxide of Preparation Example 1 were found to have higher tap densities than those of Comparative Preparation Example 1.

EVALUATION EXAMPLE 5

Evaluation of Battery Lifetime Characteristics

Figure 7:
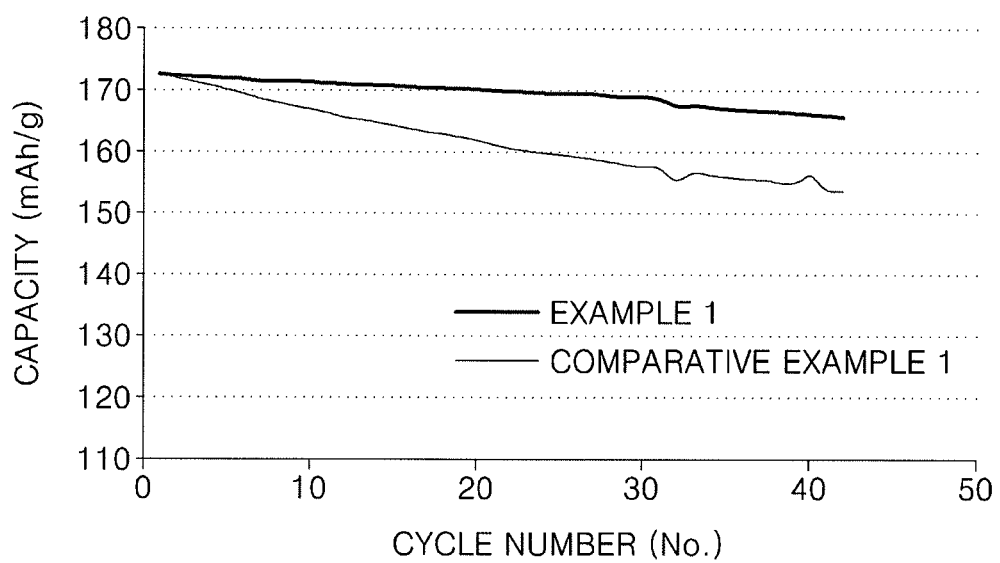
FIG. 7 illustrates a graph of lifetime characteristics of lithium secondary batteries of Example 1 and Comparative Example 2.

Lifetime characteristics of the lithium secondary batteries of Example 1 and Comparative Example 2 were evaluated according to the following method, and the results are shown in FIG. 7.

After a formation process of two charge/discharge cycles at a constant current of 0.2 C with a cutoff voltage of 3.0-4.2 V, each of the lithium secondary batteries of Example 1 and Comparative Example 2 was subjected to 30 charge/discharge cycles at a constant current of 1 C with a cutoff voltage of 3.0-4.2 V. The lifespan of each of the lithium secondary batteries was measured from variations in discharge capacitance with respect to the number of cycles.

Referring to FIG. 7, the lithium secondary battery of Example 1 was found to have better lifetime characteristics than the lithium secondary battery of Comparative Example 2.

By way of summation and review, long-term usability of a lithium secondary battery at high rates, and/or the ability to maintain an initial capacity beyond charge/discharge cycles, may depend on electrochemical characteristics of the positive active material. Along with lithium cobalt oxides, lithium nickel composite oxides have been considered as positive active materials for a lithium secondary battery. However, the lithium nickel composite oxides developed so far may not be satisfactory in particle diameter and density, and thus, there is still demand for improvement.

As described above, according to embodiments, a nickel composite hydroxide for a secondary lithium battery may have a small compositional variation, an average particle diameter of about 5 μm or greater and a spherical shape, and high-density characteristics. A lithium secondary battery with improved lifetime characteristics may be manufactured using a lithium composite oxide prepared using the nickel composite hydroxide.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A nickel composite hydroxide for a lithium secondary battery that is $Ni_{0.80}Co_{0.10}Mn_{0.05}Al_{0.05}(OH)_2$ or $Ni_{0.9}Co_{0.05}Mn_{0.025}Al_{0.025}(OH)_2$.

2. The nickel composite hydroxide as claimed in claim 1, wherein the Al has a compositional variation of about 2% or less as measured by energy dispersive spectroscopy (EDS).

3. The nickel composite hydroxide as claimed in claim 1, wherein the nickel composite hydroxide has an average particle diameter of from about 5 μm to about 25 μm, and a tap density of from about 1.0 g/cm$^3$ to about 3.0 g/cm$^3$.

4. A lithium composite oxide for a lithium secondary battery that is $LiNi_{0.80}Co_{0.10}Mn_{0.05}Al_{0.05}O_2$.

5. The lithium composite oxide as claimed in claim 4, wherein the lithium composite oxide has an average particle diameter of from about 5 μm to about 25 μm, and a tap density of from about 1.0 g/cm$^3$ to about 3.0 g/cm$^3$.

6. A positive electrode for a lithium secondary battery that comprises the lithium composite oxide as claimed in claim 4.

7. A lithium secondary battery comprising a positive electrode, a negative electrode, and a separator disposed between the positive electrode and the negative electrode, wherein the positive electrode is the positive electrode as claimed in claim 6.

8. The lithium composite oxide as claimed in claim 4, wherein the compositional variation of Al is a standard deviation of 2% or less based on a sample measured at 20 randomly chosen points by EDS.

9. A method of preparing a nickel composite hydroxide for a lithium secondary battery, the method comprising:

mixing an M-containing compound, a chelating agent, and a first solvent to prepare a chelated M precursor mixture;

preparing a nickel precursor, a second solvent, and, optionally, a cobalt precursor, to prepare a nickel-containing precursor mixture; and mixing the chelated M precursor mixture, the nickel-containing precursor mixture, a complexing agent, and a pH adjusting agent in an amount such that the prepared nickel is $Ni_{0.80}Co_{0.10}Mn_{0.05}Al_{0.05}(OH)_2$ or $Ni_{0.9}Co_{0.05}Mn_{0.025}Al_{0.025}(OH)_2$.

10. The method as claimed in claim 9, wherein the chelating agent is at least one selected from the group of acetylacetone, ethylenediaminetetraacetic acid, and benzoylacetone.

11. The method as claimed in claim 9, wherein the M-containing compound is an aluminum alkoxide.

12. A method of preparing a lithium composite oxide for a lithium secondary battery, the method comprising: mixing a nickel composite hydroxide that is $Ni_{0.80}Co_{0.10}Mn_{0.05}Al_{0.05}(OH)_2$ or $Ni_{0.9}Co_{0.05}Mn_{0.025}Al_{0.025}(OH)_2$ and a lithium compound to prepare a mixture; and thermally treating the mixture to provide a lithium composite oxide that is $LiNi_{0.80}Co_{0.10}Mn_{0.05}Al_{0.05}O_2$, or $LiNi_{0.9}Co_{0.05}Mn_{0.025}Al_{0.025}O_2$.

13. The method as claimed in claim 12, wherein the thermal treating is performed at a temperature of about 700° C. to about 900° C.

* * * * *